United States Patent
Hellström

(10) Patent No.: US 7,392,294 B2
(45) Date of Patent: Jun. 24, 2008

(54) DECREASING DATA TRANSMISSION VOLUME FROM SERVER TO CLIENT DEVICE IN DATA PROCESSING NETWORK

(75) Inventor: Henriq Karl Olof Hellström, Trelleborg (SE)

(73) Assignee: International Business Machines Corporation, Armonk, NY (US)

(*) Notice: Subject to any disclaimer, the term of this patent is extended or adjusted under 35 U.S.C. 154(b) by 770 days.

(21) Appl. No.: 10/897,168

(22) Filed: Jul. 22, 2004

(65) Prior Publication Data

US 2006/0020693 A1 Jan. 26, 2006

(51) Int. Cl.
*G06F 15/16* (2006.01)
(52) U.S. Cl. .................. 709/217; 709/219; 709/228; 709/229; 709/246
(58) Field of Classification Search .......... 709/203, 709/217, 219, 228, 229, 246
See application file for complete search history.

(56) References Cited

U.S. PATENT DOCUMENTS

| | | | |
|---|---|---|---|
| 6,256,623 B1 * | 7/2001 | Jones ........................ 707/3 |
| 6,314,492 B1 * | 11/2001 | Allen et al. ................ 711/135 |
| 6,496,849 B1 * | 12/2002 | Hanson et al. ............. 709/200 |
| 6,516,308 B1 * | 2/2003 | Cohen ........................ 706/12 |
| 6,523,063 B1 * | 2/2003 | Miller et al. ............... 709/206 |
| 7,082,476 B1 * | 7/2006 | Cohen et al. .............. 709/246 |
| 2003/0023754 A1 * | 1/2003 | Eichstadt et al. .......... 709/246 |
| 2004/0187076 A1 * | 9/2004 | Ki et al. .................... 715/513 |

* cited by examiner

*Primary Examiner*—Liangche A Wang
(74) *Attorney, Agent, or Firm*—Norman L. Gundel; Hoffman Warnick LLC

(57) ABSTRACT

A method, system and computer program product for decreasing a volume of data transmitted from a server to a client device in a data processing network, the server processing a received request for a resource from the client device, the processed requested resource comprising data embedded in a file of elements, the elements defining a format of the data. The method comprises the steps of: intercepting the processed requested resource; a first parsing step, parsing the processed requested resource to identify at least two occurrences of a formatting element; associating an identifier with the identified formatting element; a second parsing step, parsing the processed requested resource to extract each of the data elements associated with the identified formatting element; and constructing a code set comprising the identifier and each of the extracted data elements associated with the identifier.

4 Claims, 5 Drawing Sheets

DECREASING DATA TRANSMISSION VOLUME FROM SERVER TO CLIENT DEVICE IN DATA PROCESSING NETWORK

FIELD OF THE INVENTION

The invention relates to the field of Internet technologies and in particular to a method and system for decreasing the volume of data transferred from a server to a client device in a data processing network.

BACKGROUND OF THE INVENTION

Internet applications have become very sophisticated over the last few years providing a variety of web services to users, for example, on-line banking, share dealing, genealogy searches, on-line gaming, etc.

Internet applications have become widely available to a variety of users and the complexity of the internet applications has increased. This has led to a rise in network traffic and users experiencing an increase in the time required for a web page to be displayed within their browser window. This problem is further compounded by broadband Internet access not being accessible to the majority of Internet users. Hence, frustration is caused by a slow Internet dial-up connection, a high volume of network traffic, and complex internet applications that require a high amount of rendering before displaying in a browser window. In order to understand the problem further it is necessary to first look at the interaction between web servers and client devices.

To access a web page, a user running a web browser at a client device enters a Uniform Resource Locator (URL) into the web browser. The URL specifies a resource located at a web server. The web browser performs a lookup and sends the request to the web server, specified in the URL. When the web server receives the request, the web server locates the resource and determines the format and elements of the requested web page and constructs a text file according to the hypertext mark-up language (HTML) standard. The HTML file specifies the text to be written and the web page elements, such as URLs for image files that are to be displayed and the format in which they should be presented. The web server sends the requested resource in the form of an HTML file and any further data elements specified in the HTML code across the network to the client device. Therefore, each time a web browser requests a resource, whether the request is from a set of search results or a simple web page, the complete HTML file is sent across the network. Further, a complex web page layout requires a complex HTML code structure and in turn requires more HTML coding, which in turn maps to an increase in the size of the HTML file and the volume of bytes of data sent across the network.

To understand how a web page is displayed within a browser window a basic overview is given of HTML.

HTML is a mark-up language which specifies how a web page should be displayed in a browser window. HTML comprises elements and tags. Elements describe the structure of how a web page should be displayed. For example the "P" element represents a paragraph and a "B" element formats the content contained within the tags in a Bold type face.

An element has three parts: a start tag, the content, and an end tag. A tag is delimited by "<" and ">". An end tag includes a "/" after the "<." For example, the B element has a start tag, <B>, and an end tag, </B>. The start and end tags surround the content of the element. For example, <B>Hello World </B>.

Each element may further comprise an attribute. An attribute defines properties associated with the element. For example, an IMG element, which denotes an image, may comprise an SCR attribute providing the location of the image and an ALT attribute to give alternate text for browsers not capable of loading the image.

When the web browser requests a web page, the entire HTML file including graphics and downloadable files are sent in a reply message from the web server across the network to the client. The web browser receives the HTML file and renders the HTML file for display in the browser window. This process is repeated for each HTML file that is requested by the client device.

The request/reply interaction of a client and server architecture is determined by the Hypertext Transfer Protocol (HTTP), which defines the way in which web browsers interact with web servers. In HTTP version 1.0, the client requests one resource per HTTP request. Therefore, if a web page comprises five images, the web browser will issue a total of six requests to obtain the entire contents of the web page, i.e., one request for the web page and another five requests for each of the images. In use, browsers typically make several requests concurrently to reduce the overall delay to the user. Nevertheless, in order to display a requested web page on a client device, the web browser typically has to make several requests to the web server, which in turn increases network traffic.

Another contributing factor to a high volume of network traffic is the need to reload a web page. Typically, each time a user visits a web page, the user's browser must reload the web page by requesting the entire HTML code and the corresponding data elements. Although the content and the data elements on some web pages may change frequently, the content and the data elements of other web pages remain static. Therefore, even if the content and the data elements of a web page remain static, the content and data elements for the particular web page are sent from the server across the network to the browser application on the client machine.

In order to alleviate the problem of increased network traffic and the length of time that a web page takes to be displayed in a browser window, a number of solutions have been proposed.

One such solution is disclosed in US 2002/0032701 A1, incorporated herein by reference, in which the solution describes the independent update of individual display elements of a web page without reassembling the entire web page. US 2002/0032701 categorises a web page into individual objects that may be separately updated using the browser's local cache. Therefore US 2002/0032701 is a caching mechanism that may process each object on a web page separately and for each of the objects detect changes to the object on the web server. Hence, only those objects that have changed are requested from the server. Objects that have not changed are requested from the cache located on the client device. A disadvantage with this approach is that a user must have previously visited a web page for the comparison between data objects to take place to ensure that the same object is not sent to the client machine more than once.

Therefore there is a need for a method and system which reduces the volume of data transmitted from a server to a client device and alleviates the aforementioned problems.

SUMMARY OF THE INVENTION

Viewed from a first aspect the present invention provides a method for decreasing a volume of data transmitted, from a server to a client device in a data processing network, the server processing a received request for a resource from the client device, the processed requested resource comprising data embedded in a file of elements, the elements defining a format of the data, the method comprising the steps of: intercepting the processed requested resource; a first parsing step, parsing the processed requested resource to identify at least two occurrences of a formatting element; associating an identifier with the identified formatting element; a second parsing step, parsing the processed requested resource to extract each data element associated with the identified formatting element; and constructing a code set comprising the identifier and each of the extracted data elements associated with the identifier.

The present invention provides for intercepting a request for a resource which has been received and processed by a web server. The processing of the request may be carried out by a server side processing component. The processed request may be a set of search results embedded within an HTML file. The HTML file is parsed to identify at least one unique data element embedded between a pair of HTML tags and each of the identified unique data elements are extracted from the HTML file and placed into a character string.

Once the unique data elements are extracted from the HTML file, the HTML tags are parsed to identify the HTML tags that occur the most number of times within the received requested resource. Often, when displaying data in a structured format, i.e., in a table structure, within a web page, the same HTML tags are repeated in order to create a repetitive structure. If for example, a requested resource displays one hundred records in a table structure within a web browser, the HTML code required to format the one hundred records in a table is repeated for each record. Therefore, by identifying the HTML tags that occur multiple times and associating an identifier with the identified multiple occurrences of the HTML tags, only the identifier and the associated record is sent to the requesting client device. Therefore, instead of sending multiple occurrences of the same HTML tag, only one identifier associated with the multiple HTML tags needs to be sent to the client device. Thus, reducing the volume of data sent across the network.

A rendering controller on the client device receives the unique data elements and the rendering code set. The rendering controller launches the rendering code set and constructs a web page according to the variables and arguments supplied in the rendering code set. Because the entire HTML file is not being sent across a network and only a rendering code set is sent, the volume of data sent is less than known traditional methods. Further, because the rendering code set is dynamically building the web page at the client device, the rendering is performed faster as opposed to interpreting many individual lines of HTML code.

Viewed from a second aspect the present invention provides a method for receiving a code set transmitted from a server for receiving by client, the code set comprising an identifier, the identifier being associated with a formatting element, the formatting element defining a format of a data element, the method comprising the steps of: parsing the code set to determine an identifier and associated data elements; determining a function of the identifier in relation to an associated formatting element; and in response to the determining step rendering a requested resource in accordance with the determined function of the identifier.

Viewed from a third aspect the present invention provides a system for decreasing a volume of data transmitted from a server to a client device in a data processing network, the server processing a received request for a resource from the client device, the processed requested resource comprising data embedded in a file of elements, the elements defining a format of the data, the server comprising: an optimization manager, the optimization manager comprising: means for intercepting the processed requested resource; means for first parsing the processed requested resource to identify at least two occurrences of a formatting element; means for associating an identifier with the identified formatting element; means for second parsing the processed requested resource to extract each data element associated with the identified formatting element; and means for constructing a code set comprising the identifier and each of the extracted data elements associated with the identifier.

Viewed from a fourth aspect the present invention provides a computer program product loadable into the internal memory of a digital computer, comprising software code portions for performing, when said product is run on a computer, the methods of the present invention.

Viewed from a fifth aspect the present invention provides a web service for decreasing a volume of data transmitted from a server to a client device in a data processing network, the server processing a received request for a resource from the client device, the processed requested resource comprising data embedded in a file of elements, the elements defining a format of the data, the web service comprising the steps of: intercepting the processed requested resource; a first parsing step, parsing the processed requested resource to identify at least two occurrences of a formatting element; associating an identifier with the identified formatting element; a second parsing step, parsing the processed requested resource to extract each data element associated with the identified formatting element; and constructing a code set comprising the identifier and each of the extracted data elements associated with the identifier.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
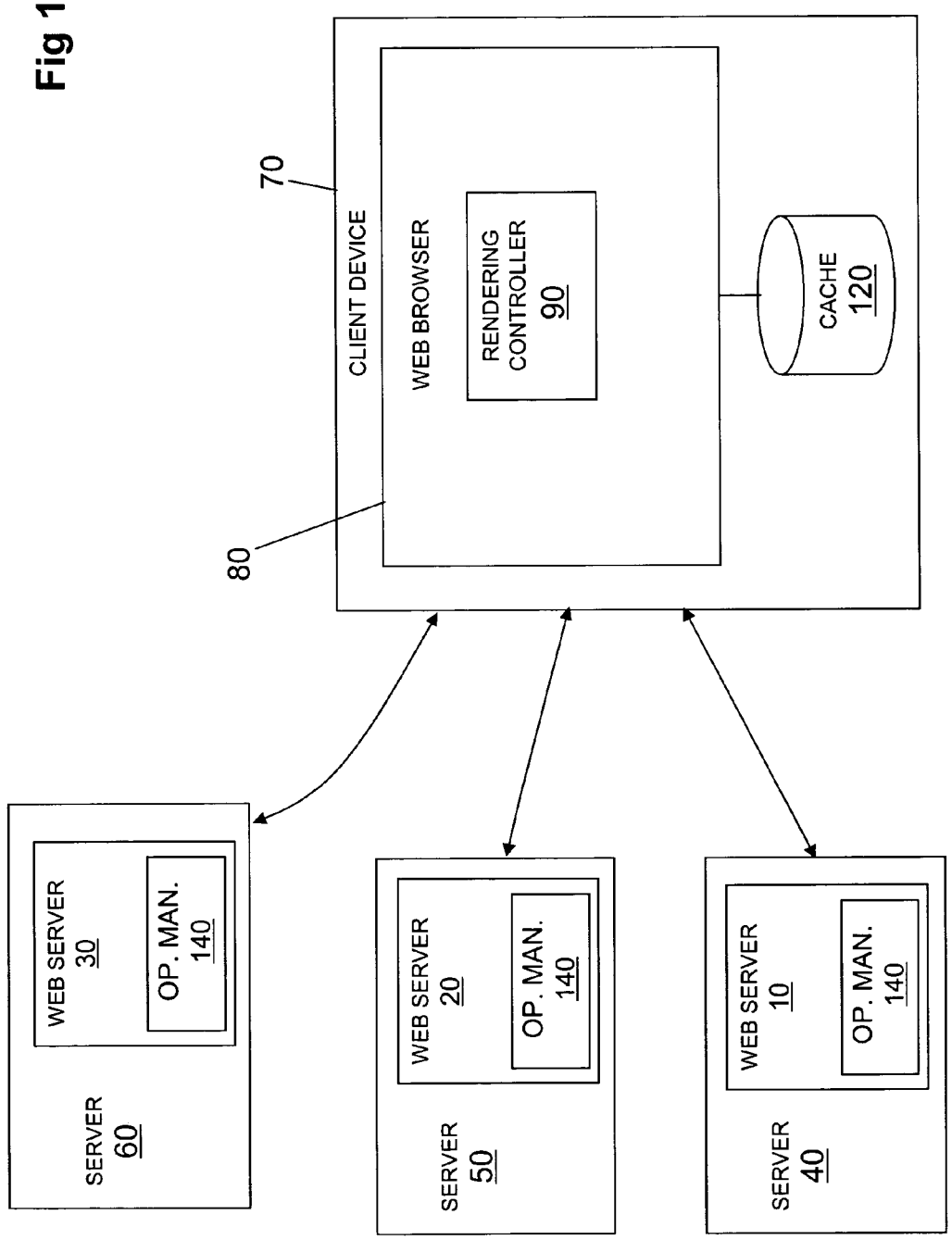
FIG. 1 shows the components of a data processing network in which the invention may be embodied.

Where reference is made in any one or more of the accompanying drawings to steps or features that have the same reference numerals, those steps or features have substantially the same function(s) or operation(s) for the purposes of this description.

FIG. 1 shows a number of components of a data processing network, including a number of web servers 10, 20, 30 running on mainframe servers 40, 50, 60 that are connected for communication with a client device 70. The web servers 10, 20, 30 are each running an optimization manager 140.

The client device 70 is running a web browser application 80 and a rendering controller 90. As is known in the art, a web browser is an application program which is capable of sending Hypertext Transfer Protocol (HTTP) requests to web servers to access information on the World Wide Web. Alternative embodiments of the invention include browsers or other client requestor programs which support the File Transfer Protocol (FTP), Lightweight Directory Access Protocol (LDAP) or other protocols for sending requests.

The client device 70 and the servers 40, 50, 60 may be remote from each other within the network, such as if the invention is used for searching for desired web pages on devices connected within the Internet and accessible via the World Wide Web. The client device 70 and the server 40, 50, 60 could equally be components of a local network or intranet.

The client device 70 is not limited to a particular type of data processing apparatus, and may be a conventional desktop or lap-top personal computer, a personal digital assistant (PDA), a mobile phone or another specialized data processing device which is capable of running a client requestor program. The client device 70 may connect to a network of servers via wireless or hard-wired connections. Similarly, the servers 40, 50, 60 can be any data processing apparatuses which are capable of running a web server, directory server or similar server program. Software-implemented elements of the embodiment described in detail below are not limited to any specific operating system or programming language.

In a first embodiment, the optimization manager 140 is implemented as a computer program module which extends and modifies the functions of a standard web server 10, 20, 30. In particular this embodiment provides a "plug-in" program for connecting to standard web server software. Alternatively, the optimization manager 140 may be hard-coded within standard web server software, for example, hard coded into a web collaboration application, such as Lotus Quick Place.

In another embodiment the optimization manager 140 may be implemented as a computer program module for generating a rendering code set for interfacing with cascading style sheets.

The optimization manager 140 cooperates with the web server 10, 20, 30 to process requests for resources. In response to a request for a resource, the optimization manager 140 optimizes the volume of data in a reply message for transmitting back to the requesting client device 70.

Moving on to the client device 70, the rendering controller 90 is implemented as a computer program module which extends and modifies the functions of a standard web browser 80. In particular, this embodiment provides a "plug-in" program module for connecting a standard connection interface of Netscape Corporation's Netscape Communicator web browser program, or other now known or later developed web browser programs. As is known in the art, "plug-in" modules are programs that can be easily installed and used as part of a Web browser. Once installed, "plug-in" modules are recognized automatically by the web browser and the web browser and plug-in modules call each other's functions via a simple API.

A number of "plug-in" components are already widely available for use with Microsoft Corporation's Internet Explorer or Netscape Corporation's Netscape Communicator Web Browsers. An explanation of plug-ins for Netscape Communicator, their use and development is available from Netscape Corporation. Since the interfaces and development of "plug-in" components to add functions to an existing web browser are understood by those skilled in the art, the interfaces and development steps will not be described in detail herein.

A cache store 120 cooperates with the rendering controller 90 to store past URL requests. The cache store 120 may comprise any type of storage and retrieval mechanism, such as, for example, IBM's DB2 database system.

A web resource, for example, a web page, an image, or a downloadable file, etc., is accessed by entering a URL into the web browser 80 or by clicking on a URL hyperlink embedded in a web page. The web browser 80 routes the URL request via the HTTP protocol to the web server 10, 20, 30 stated in the URL. The web server 10, 20, 30 on receiving the request performs a look up and retrieves the requested resource for sending back to the requesting web browser 80 on the client device 70. The requested resource may be a set of search results in the form of a list of URL hyperlinks, as typically seen when searching with well known search engines, or the requested resource may be a set of records as returned by a specialist search tool, for example, when searching for a number of employee records across an Intranet. Regardless of the type of search results returned, the search results are often returned to the requesting web browser in a structured format, i.e., the layout of one record is the same as another. An example of this is shown in FIG. 2.

Figure 2:
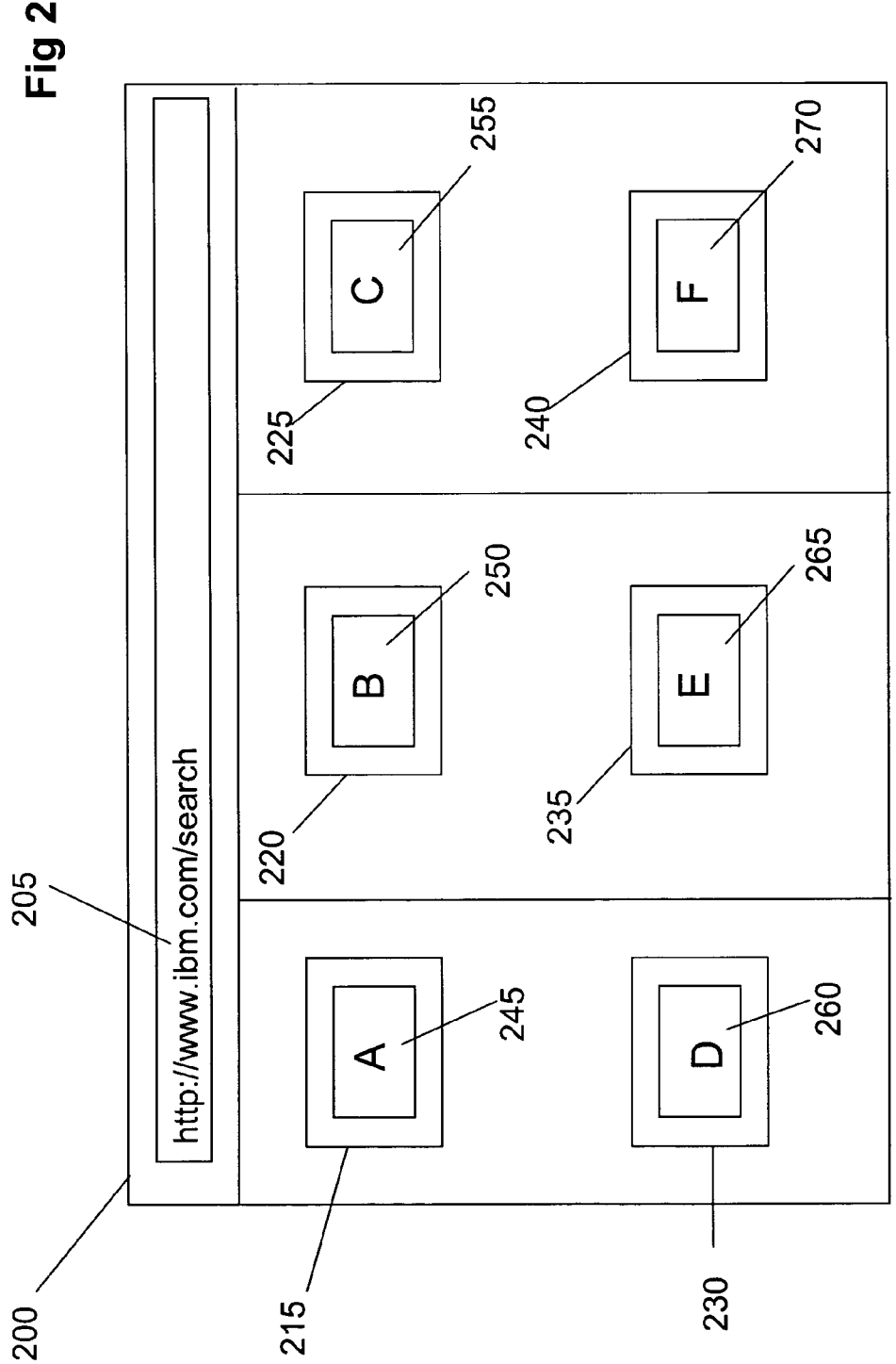
FIG. 2 illustrates the formatting and structure of a set of records as displayed in a browser window as in known in the art.

FIG. 2 illustrates a web page 200, with a set of search results 245, 250, 255, 260, 265, and 270. The search results are obtained by entering a search criterion into the URL address component 205. In this example, the search engine located at "www.ibm.com/search" retrieves the request and sends the search results back to the requesting web browser 80 in the form of an HTML file.

On receiving the requested resource the web browser 80 formats the search results according to the formatting requirements as specified in the HTML code. In this example, the search results comprise six record sets 215, 220, 225, 230, 235, and 240. Each record set comprises a number of records A, B, C, D, E, and F. Each record A, B, C, D, E, and F may comprise different data, for example, record A may include the name Mrs. Smith, but record B may include other names, such as Mr. Smith and so on. Each record A, B, C, D, E, and F will vary according to the entered search criterion, but the formatting of each record set 215, 220, 225, 230, 235, and 240 remains the same. This is apparent from FIG. 2 where the "look and feel" of the web page is the same for each of the record sets 215, 220, 225, 230, 235, and 240. Web application designers design web applications to provide users with a structured and easy to use interface. Often, for example, a directory service, a search engine, a genealogy service will all return their search results in the same, consistent and structured format. Therefore, it does not matter to the web application designers what records are returned, but is it more a case of how the records are displayed. Further when using server side processing, such as JavaServerPages (JSP) to process and format the records set, the HTML code is written once and is not usually written to display the records sets a number of different ways according to different environmental variables. JavaServerPages is a trademark of Sun Microsystems Inc. in the US and other countries.

Figure 3:
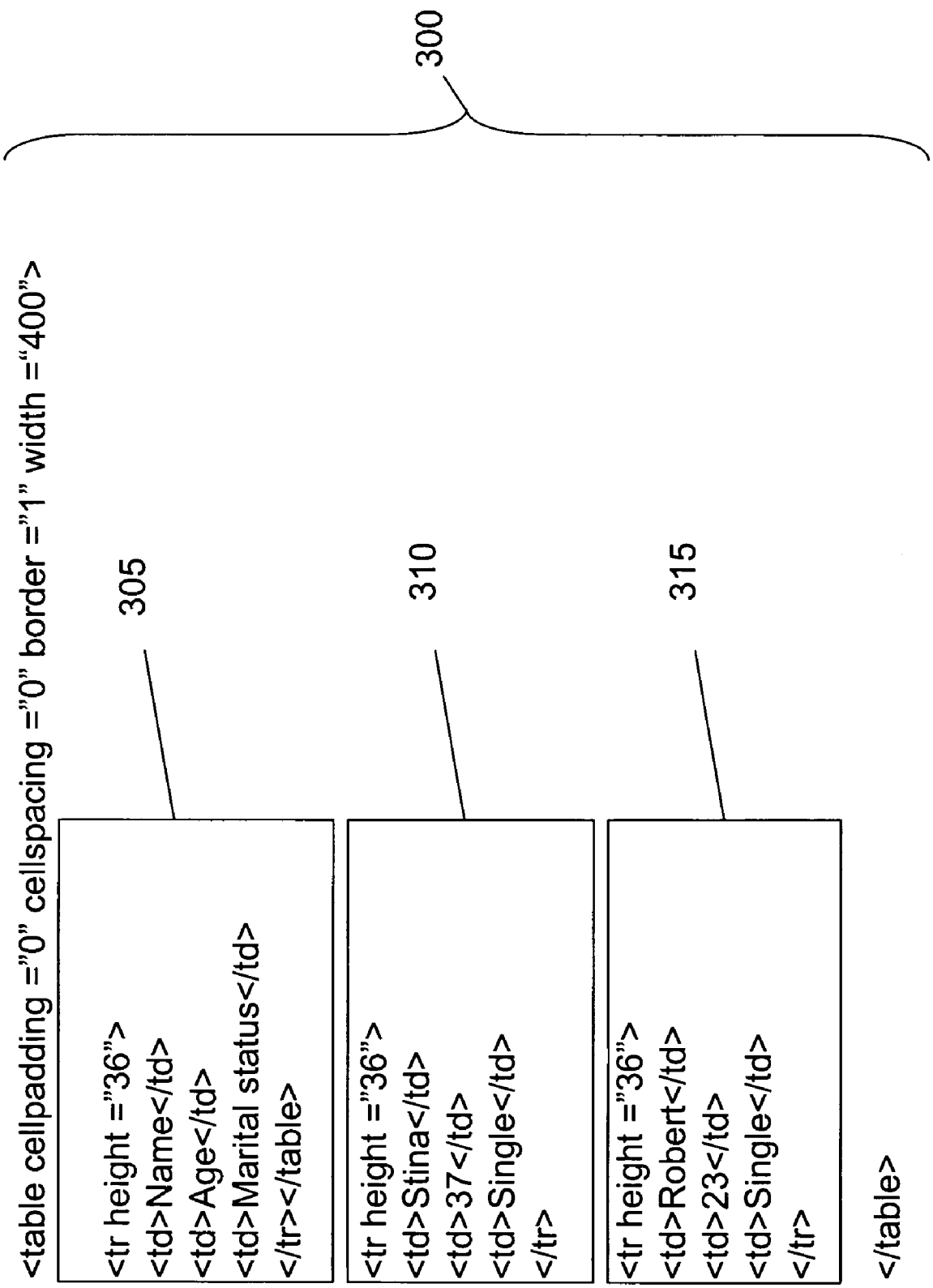
FIG. 3 illustrates the HTML that is required to format the set of records as shown in FIG. 2 as is known in the art.

Moving on to FIG. 3, the HTML required to format the record sets 215, 220, 225, 230, 235, and 240 of FIG. 2 is shown. To improve clarity, the HTML tags have been grouped into tag sets and numbered 305, 310, and 315. This grouping is for illustration purposes only. The record sets are formatted into a table structure as can be seen by reference numeral 300 denoting the start and closing <table> tags. The web browser 80 interprets each line of HTML code one line at a time. In the example, in FIG. 3, the web browser 80 firstly interprets the table tag and its attributes 300. In this example the table attributes include the padding of each cell, including how far the cell should be spaced from the adjacent cell, the border around the table and the width of the table.

Next, the web browser 80 traverses through the HTML tags to format the rows, columns and the data within the table. As shown in FIG. 3, the first set of tags the web browser 80 traverses within the tag set 305 is a <tr> tag. The <tr> tag instructs the web browser 80 to format a row within the table. Next, the web browser 80 moves to the <td> tag within tag set 305 which informs the web browser 80 to display a column within the table. Within the tag set 305 there are three sets of <td> tags which instruct the web browser 80 to display three columns, each column having an identifier, i.e., Name, Age, and Marital Status.

After the tag set 305 is rendered, the web browser 80 moves to the next line of HTML tags, i.e., tag set 310 in this example. Again, the web browser 80 traverses the <td> tags, which as shown in FIG. 3 comprises three sets of <td> tags and therefore three columns to be formatted within the table along with the data, Stina, 37, and Single, which is to be formatted under identifiers Name, Age, and Marital Status.

The same process as described for tag sets 305 and 310 is performed for tag set 315. Once the web browser 80 has read each line of HTML code the web page is displayed as shown in FIG. 2.

As can be seen from FIG. 3, when a server side script generates the HTML code for a given web page (or this is performed manually), there is repetition of many of the HTML tags. For example, the HTML required to format the columns and rows for the table in FIG. 3 is the same for each tag set 305, 310, and 315.

This repetition of HTML tags in itself increases the amount of data that is sent across the network. If the HTML code of FIG. 3 is repeated for one thousand records in a record set, the number of HTML lines of code to be sent across the network to the client device 70 is potentially high. The web browser 80 on receiving the HTML page with the thousand lines of code is then required to format the HTML code, which in itself takes time.

Therefore in order to reduce the volume of data (HTML tags and data) sent from the server 40, 50, 60 across the network to the web browser 80 on the client device 70, an optimization manager 140 intercepts the requested resource on the web server 10, 20, 30 before the requested resource is sent to the requesting web browser 80.

Figure 4:
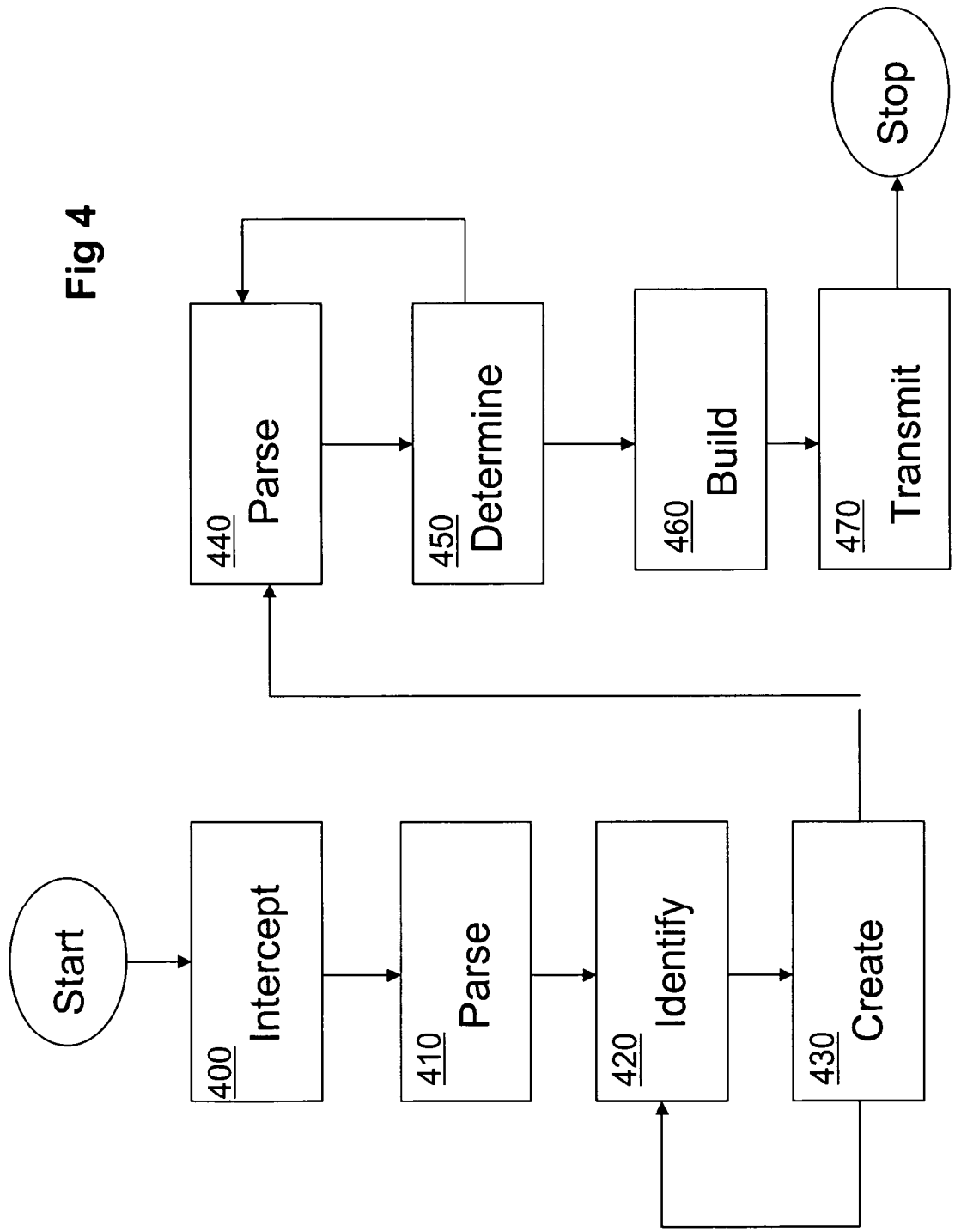
FIG. 4 illustrates the process steps of the optimization manager located on the server of the invention.

Referring to FIG. 4, the process steps the optimization manager 140 performs in order to decrease the volume of data sent across the network is shown. The optimization manager 140 intercepts the processed requested resource before it is sent to the requesting client device 70 at step 400. On interception, the optimization manager 140 parses each HTML tag at step 410 to identify one or more unique data elements embedded within the HTML tags, i.e., the data content of the requested resource, at step 420.

The optimization manager 140 parses each HTML tag within the requested resource and identifies each data element held between a start < > and an end </> tag. In particular the optimization manager 140 identifies data embedded between certain types of HTML tags, for example, table tags, paragraph tags, and other tags generally used for formatting data content. Content data embedded between tags, such as body tags, etc., may generally be ignored. A systems administrator may create a ranked list of HTML tags which have a higher order of ranking than others. The HTML tags which appear the highest in the list are the HTML tags for which data content may be identified. The optimization manager 140 on parsing the HTML tags performs a look up within the ranked list to determine the HTML tags from which data should be extracted.

In another embodiment a server side script may generate a primary key or a hash value to identify data which may be extracted by the optimization manager 140. A selection mechanism may be employed by the optimization manager 140 to locate the primary key for identifying the data that may form a record within the record set. The primary key may either be an attribute which is guaranteed to be unique, for example, a URL, an employee number or a social security number, etc., or the primary key may be a unique identifier which is generated by the server side processing when, for instance, a set of search results are returned. The primary key may consist of a single attribute or Multiple attributes in combination. For example, the server side processing component may return to the optimization manager 140 three sets of records; students, classes, and graduating. Each record set comprises multiple records, each record comprising information pertaining to the student. A student may share the same name and attend the same classes, etc., but as no two students have the same student number, the primary key would in this instance be the student number.

On selection of the data elements, the optimization manager 140 extracts the data element and assigns each of the data elements into a string of characters at step 430. For example, on locating the data elements embedded within the HTML code of FIG. 3, the optimization manager 140 creates the following character string:

Character String

Name, Age, Marital Status; Stina, 37, Single; Robert, 23, Single.

Looking at the character string above a unique character delimitates each field within the identified record set, for example, a comma. A further unique character distinguishes each record set from other record sets, for example, a semicolon separates the record set belonging to "Stina" from the record set pertaining to "Robert," etc. The optimization manager 140 may be configured to recognize other unique identifiers, for example, colons, etc.

Moving onto step 440, the optimization manager 140 parses each of the HTML tags within the requested resource to determine which HTML tag pair occurs more than a predetermined number of times within the HTML code, for example a <tr></tr> tag pair occurring more than twice. The optimization manager 140 keeps a count in memory of each start tag < > and end tag </> that form a tag pair to calculate the number of times each HTML tag pair occurs. For clarity an HTML tag pair is referred to as an HTML tag.

The predetermined threshold may be configured by a system administrator at runtime to achieve a variety of configurations or hard coded into the optimization manager 140 at development time.

The optimization manager 140 parses each of the HTML tags at step 440 and determines if any of the HTML tags meet the predetermined threshold at step 450. Using the example of FIG. 3, the optimization manager 140 parses each of the HTML tags and keeps a count of how many times the <table></table> tags occur, followed by the <tr></tr> tags and the <td></td> tags. As each of the HTML tags occur more than twice (as set by the predetermined threshold), these tags are determined to be the most common occurring tags. The most common occurring tags are extracted from the HTML file. It will be appreciated by a person skilled in that art that other permutations of HTML tags may be identified by the optimization manager 140.

Using the example code in FIG. 3, the optimization manager 140 identifies the <table>, <tr> and <td> tags within the tag sets 305, 310, and 315 as the most common occurring tags (step 450). The optimization manager 140 extracts the identified tags from the HTML file and proceeds to assign a variable (or an identifier) to each of the identified HTML tags, as is shown in Example 1.

EXAMPLE 1 t = '<table cellpadding="0" cellspacing="0" border="1" width="400">; </table>'
s = '</td><td>'
c = '<tr height="36"></tr>'
f = '</table>'

As is shown in Example 1, the optimization manager 140 assigns variables t, s, c and f to the identified HTML tags. The <table> tag is assigned to the variable t. Variable t holds the HTML <table> tag in memory including the attributes associated with the table, i.e., cell padding and cell spacing, etc. The <td> tag including the </td> closing tag is assigned to variable s and the <tr> tags including the closing tag is assigned to variable c. The above assigned variables allow the tags and their attributes to be stored in memory for manipulation by the rendering controller 90 on the client device 70.

As will be appreciated by a person skilled in the art any variable may be assigned to the identified HTML tags and is not limited the variables or any other identifier identified within the scope of the invention.

Taking the character string created at step 430, the optimization manager 140 creates a multidimensional array for holding each identified data element. The optimization manager 140 loops through the character string and determines the number of data stores required in order to create the array. For example, the number of columns and rows required to hold each data element in the required format.

The optimization manager 140 loops through the character string and determines that an array is required with three columns and three rows. The optimization manager 140 in this instance determines that Name, Age, and Marital Status are identifiers for the data and hence the identifiers are assigned to each of the columns within the array. For example, to display the identifiers in the following table:

EXAMPLE 2

| Name | Age | Marital Status |
|------|-----|----------------|
|      |     |                |

The following multi dimensional array is created:
a[1][0]='Name'
a[1][1]='Age'
a[1][2]='Marital Status'

When creating a multi dimensional array two numbers are used to identify a position in the array, i.e., the position of the columns and the rows. In Example 2, the character string is assigned to the variable a. The array comprises two numbers encased in square brackets. The first number being the number of the row and the second number being the number of the column. For example, a[1][0]; [1] being the row number and [0] being the column number.

Next, the created multi dimension array is written to a JavaScript file for building into a rendering code set at step 460, along with the extracted HTML tags and the assigned variables (step 450). The optimization manager 140 creates a further code set to embed within the identified HTML tags to dynamically create the HTML columns and rows. The additional code set is written to the JavaScript file in order to continue building the rendering code set. For example, the variable c is assigned to the <tr> tag at step 450 and is embedded within the <tr> tag to dynamically build and populate each row with the data within the multi dimensional array. An example of this is shown below.

'<tr height="36">'+a[i][0]+s+a[i][1]+s+a[i][2]+a[i][2]+</tr>'

As JavaScript is an interpreted language and is rendered in the order that the browser 80 reads the JavaScript code and the HTML, the optimization manager 140 writes to the JavaScript file a further code set with loops through each code set written to the JavaScript file to build and render the requested resource on the client device 70.

Each time the optimization manager 140 extracts at least one HTML tag (tag pair) or unique data from the HTML file, the optimization manager 140 embeds links into the HTML to indicate to the rendering controller 90 at which point in the HTML code to make a function call to the rendering code set.

With reference to each step of FIG. 4, it should be obvious to a person skilled in the art that these steps do not necessarily have to be carried out in the order described hereon in, but that other permutations and variations are possible.

The code rendering set is encapsulated into a function, for example, a function called renderRecordset( ) and packaged into a payload component. The payload component is sent across the network to the requesting web browser 80 at step 470, for receiving by the rendering controller 90. The final rendering code set which is packaged into the payload component is shown in Example 3. The base HTML may be sent with the rendering code set or transmitted separately to the requesting client device 70.

EXAMPLE 3

```
function renderRecordset( ){
//start of table
t = '<table cellpadding="0" cellspacing="0" border="1" width="400">';
//end of table
f = '</table>';
s = '</td><td>';
c = '<tr height="36">'+ a[i][0] + s + a[i][1] + s + a[i][0] + '</td></tr>';
a = 'Name,Age,Status;Stina,22,Single;Robert,37,Married';
a.split (';');
for(i=0;i<a.length;i++){
    a.[i]=a[i].split(',')
}
dc = t
for(i=0;i<a.length;i++){   dc += c
}
dc += f;
return(dc);
}
//A document.write function is inserted into the HTML code when ever the renderRecordset( )
function is called.
<script>
document.write(renderRecordset( ));
</script>
```

Figure 5:
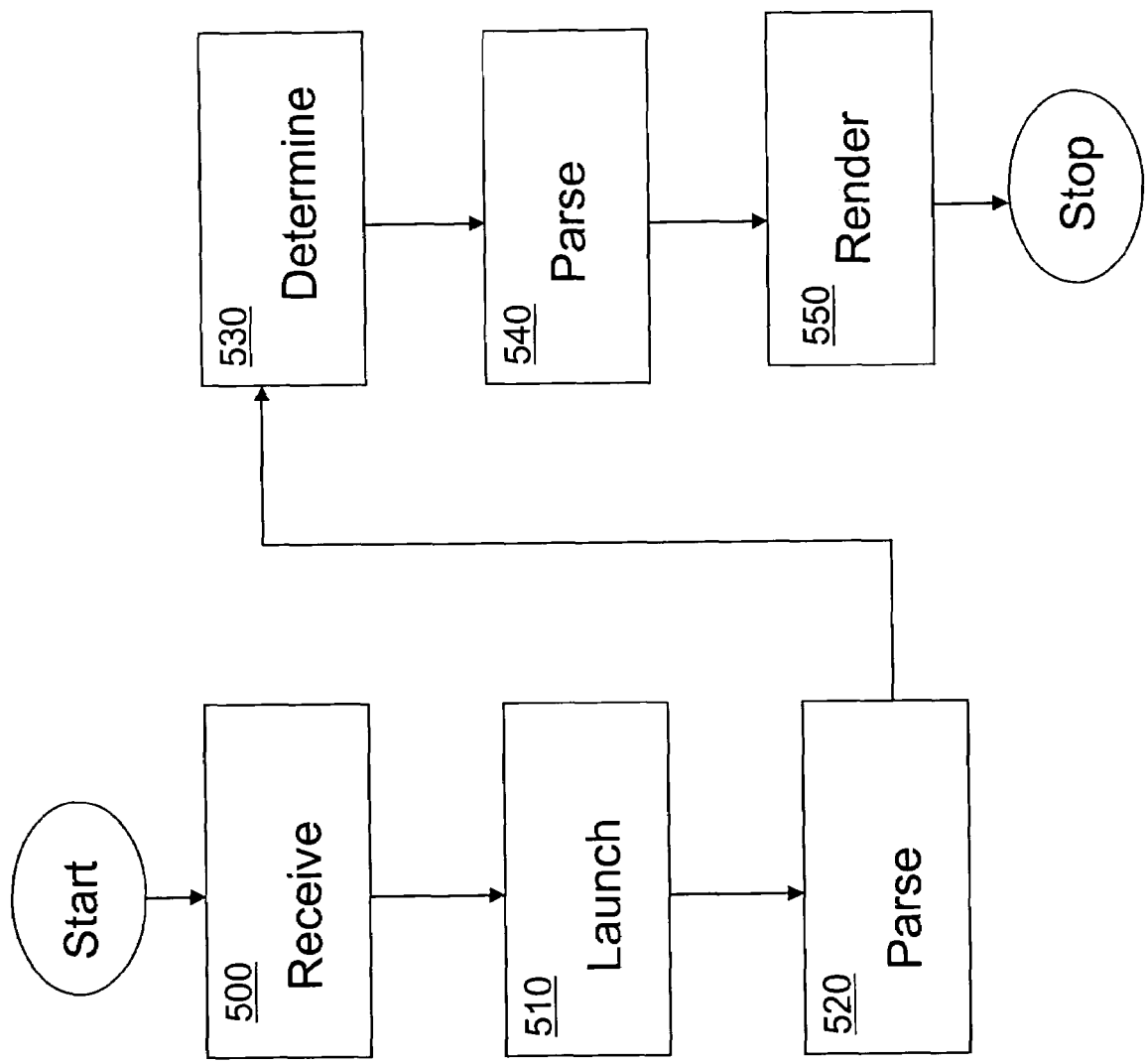
FIG. 5 illustrates the process steps of the requesting client device on receiving a payload constructed by the optimization manager of FIG. 4.

Now moving onto the client device 70 and with reference to FIG. 5, the client device 70 receives the payload component from the optimization manager 140 at step 500. The rendering controller 90 unpacks and launches the rendering code set by a series of function calls at step 510. The function calls are embedded into the HTML code by the optimization manager 140 when the optimization manager 140 extracts HTML tags or data elements from the requested resource.

The rendering controller 90 parses the rendering code set at step 520 and determines the function of each of the variables associated with the extracted formatting element at step 530. The rendering controller 90 may perform a look up in a data store within the browser 80 to understand the function of the formatting element associated with the identifier, or the description of the function may be sent to the client in a separate text file.

At step 540, the rendering controller 90 continues to parse the rendering code set, interpreting each line of code, line by line, in order to construct a data structure to hold each of the data elements in accordance with the function of each of the formatting elements. Once the data structure is constructed, the rendering controller 90 populates the data structure with each of the data elements and renders the requested resource as determined by the function of the variables at step 550. In parallel with step 550, the rendering component renders any other HTML file associated with the requested resource, for example, an HTML file comprising HTML tags which were not determined as occurring multiple times within the requested resource at step 450 of FIG. 4.

It should also be understood that the present invention can be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

It should also be appreciated that the teachings of the present invention could be offered as a business method on a subscription or fee basis.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for decreasing a volume of data transmitted from a server to a client device in a data processing network, the server processing a received request for a resource from the client device, the processed requested resource comprising data embedded in a file of elements, the elements defining a format of the data, the method comprising the steps of:

intercepting the processed requested resource;

a first parsing step, parsing the processed requested resource to identify at least two occurrences of a formatting element, wherein the first parsing step further comprises performing a look up within a ranked list of formatting elements to determine which formatting elements to parse;

associating an identifier with the identified formatting element;

determining a function of the identifier in relation to the associated formatting element;

a second parsing step, parsing the processed requested resource to extract each data element associated with the identified formatting element;

constructing a code set comprising the identifier and each of the extracted data elements associated with the identifier; and in response to the determining step rendering the requested resource in accordance with the determined function of the identifier.

2. A method as claimed in claim 1 wherein the first parsing step further comprises determining if the occurrence of the formatting element falls within a predetermined threshold.

3. A method as claimed in claim 1 wherein the step of constructing comprises embedding a function call at a position the formatting element or data element is extracted from the requested resource.

4. A method as claimed in claim 1 wherein a formatting element comprises a mark-up language tag.

* * * * *